Figure 1:
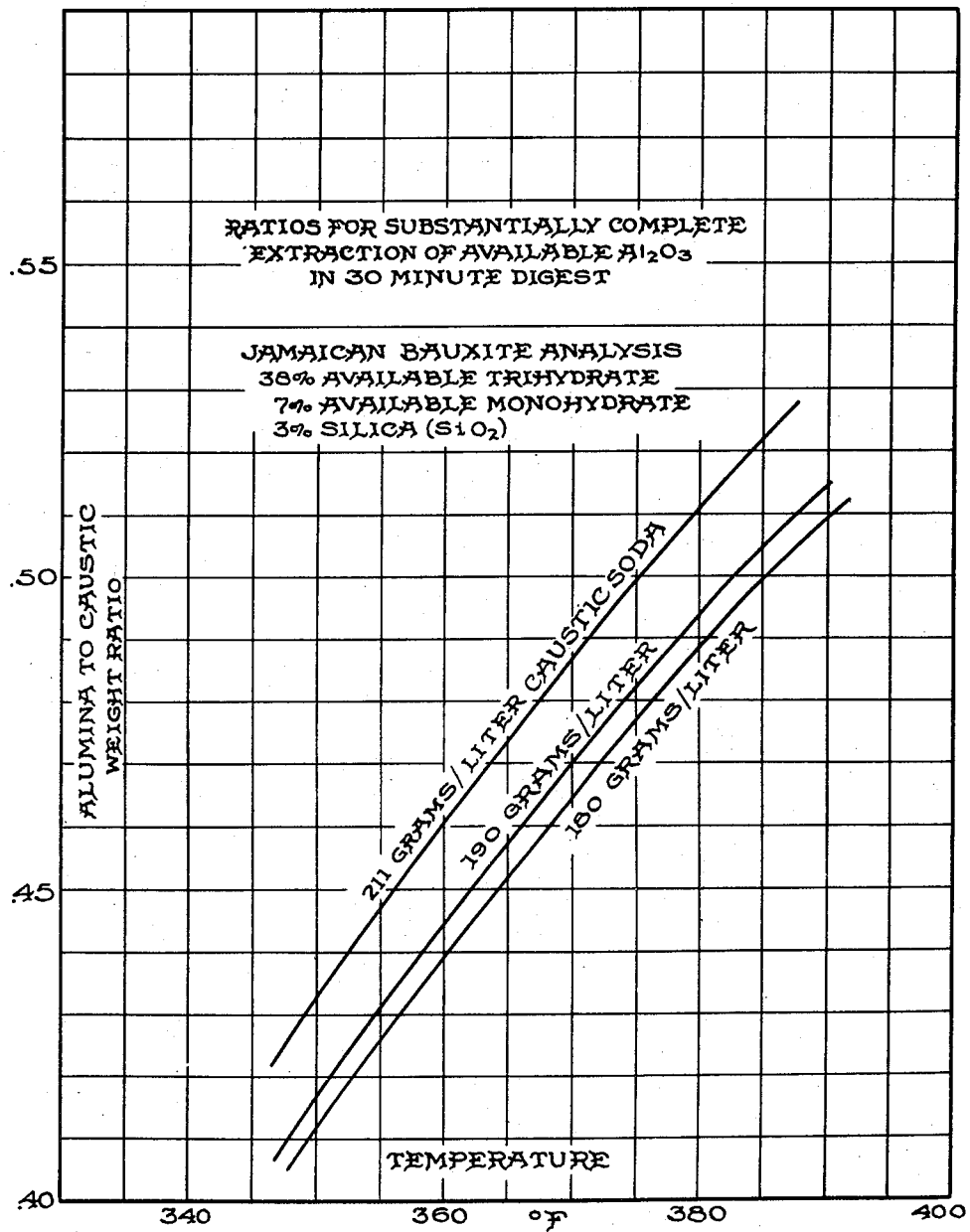

Feb. 8, 1955  J. L. PORTER  2,701,752
PROCESS FOR THE PRODUCTION OF ALUMINA
Filed Dec. 19, 1951  2 Sheets-Sheet 2

INVENTOR
JOHN L. PORTER
BY
James E. Toomey
ATTORNEY

2,701,752
Patented Feb. 8, 1955

2,701,752

PROCESS FOR THE PRODUCTION OF ALUMINA

John L. Porter, Baton Rouge, La., assignor to Kaiser Aluminum & Chemical Corporation, Oakland, Calif., a corporation of Delaware Application December 19, 1951, Serial No. 262,414

18 Claims. (Cl. 23—143)

The present invention relates to an improved process for the production of alumina from aluminous ores by the wet alkali aluminate method. More particularly, the invention is directed to a novel process based on the well-known Bayer method of extraction of alumina from aluminous ores and is applicable to the production of alumina from two or more ores, wherein all of the alumina or a predominant amount thereof is present in the form of alumina trihydrate in at least one of the ores, and wherein at least one of the ores contains at least substantial quantities of alumina in monohydrate form; or from a single aluminous ore wherein the alumina is predominately in the form of aluminum trihydrate but a substantial proportion of the total alumina is in the form of monohydrate.

The wet alkali aluminate method for the production of alumina from aluminous ores, more commonly referred to as the Bayer process, as is well known, involves subjecting a slurry of the raw ore in recycled spent caustic aluminate liquor of a predetermined caustic soda concentration to a digestion treatment at elevated temperatures under steam pressures to extract the caustic soluble or available alumina in the ore and to produce an alumina or sodium aluminate enriched caustic soda liquor- in which is suspended the ore residue consisting essentially of hydrated ferric oxide, desilication products in the form of complex sodium aluminum silicates, together with small amounts of other insoluble components of the ore such as titanium dioxide ($TiO_2$). Following digestion, the green liquor containing the insoluble residues is cooled by stagewise depressurization and then subjected to clarification wherein the insoluble residues are removed by settling and/or filtration. In all cases the filtered product is hot green liquor substantially free of the red mud residue. Following vacuum flash cooling which increases the degree of supersaturation, the green liquor filtrate is processed for the recovery of the dissolved alumina by the introduction of fine previously precipitated alumina hydrate as seed. The resultant precipitation of the alumina hydrate from the pregnant liquor is usually allowed to proceed under controlled conditions for a selected period of time to obtain a predetermined yield of alumina hydrate or spent liquor alumina to caustic soda ratio (the so-called finishing ratio) of a predetermined value. Generally, the precipitation in a given cycle proceeds to the point where approximately 50% of the dissolved alumina in sodium aluminate form has been precipitated as alumina hydrate. The precipitate is usually classified and the fine material recycled to the precipitation phase as seed hydrate. The coarse faction is washed to remove accompanying spent liquor, filtered, and calcined for the removal of both free water and water of crystallization. The spent liquor from the precipitators is recycled to the digestion phase of the process after concentration to the required caustic soda concentration depending upon digestion conditions, and after addition of makeup caustic soda.

This Bayer process used for the production of high purity alumina has been highly developed for the purpose of treating two distinct types of bauxite. The American version of the Bayer process is adapted to the efficient processing of high grade gibbsite ore of South America in which the hydrated alumina exists as the more caustic-soluble trihydrate. The European version of the process employs operating conditions necessary for the treatment of the boehmite ores of France, Greece or Yugoslavia in which the alumina is in the less caustic soluble monohydrate form. The American process has an additional lime-sinter step used to recover soda and alumina from the red mud residue when a high silica gibbsite bauxite of Arkansas or Alabama is being processed, since the high alumina and soda loss in the form of insoluble desilication products cannot be tolerated.

The difference in caustic solubility of the monohydrate alumina and trihydrate alumina, the principal constituents of the boehmite and gibbsite ores respectively, is the predominant reason which leads necessarily to the utilization of entirely different conditions for processing the two types of ores in order to insure recovery of the maximum available alumina. A lesser reason for the difference in treating methods for these minerals is the physical nature of the ore itself. Thus, in the single digestion method in Europe, where the rock-like boehmite or monohydrate type of ore is processed, caustic concentrations and temperatures as high as 425 grams per liter (all caustic concentrations are based on the well known acid titratable method of analysis and reported as equivalent $Na_2CO_3$) and 390° F. respectively, are employed. The digester effluent charging ratios (alumina to caustic soda ratios of the green liquor) obtained under these conditions are substantially below those obtained in the American Bayer method for the extraction of the trihydrate alumina from the gibbsite type of bauxite. Furthermore, not only is the trihydrate or American process productive of higher charging ratios than the European monohydrate process, but less drastic conditions of caustic concentration and temperature are employed for obtaining these beneficial charging ratios.

The benefits of the higher charging ratio and lower caustic concentrations associated with the American trihydrate process are reflected in the precipitation phase of the Bayer process. The lower digester caustic concentrations permit lower caustic concentrations to be economically utilized in the precipitators or decomposers. The lower caustic concentration and higher alumina to caustic soda ratio of the pregnant liquor found in the conventional trihydrate process combine in effect to give a product containing lesser amounts of fines in a shorter precipitation cycle. The fact that a greater yield of precipitated alumina per unit of time can be realized in the trihydrate process because of the above mentioned factors, is obviously beneficial from an equipment standpoint of view. On the other hand, a product which contains lesser amounts of fines is highly desirable, especially in view of the fact that more than 1% of the product is usually lost in calcining and handling, the loss being attributed directly to the fine nature of the calcined product.

One cause of the larger particle size in the alumina produced in America is the fairly elaborate hydrate classification system. Nevertheless, this system of retaining the fine seed until the particle is built up to a sufficient size is possible because of the more favorable conditions in the precipitation phase of the process. The driving force for autoprecipitation, i. e. the lower caustic concentration in combination with temperature in respect to the alumina to caustic soda ratio, is more easily attained in the trihydrate version of the Bayer process and is substantially responsible for the coarser product. This is also an influencing factor in the shorter time for precipitation of an equivalent amount of product because higher finishing ratios or alumina to caustic soda ratios in the spent liquor from the precipitators can be tolerated with the result that the supersaturation produced by a temperature decrease has a more pronounced effect with higher ratio pregnant liquors. Furthermore, the more caustic soda dilute and more alumina supersaturated aluminate solutions going to the precipitators in the American trihydrate process makes it possible to obtain a coarse product with only about two parts of seed used per part of alumina sent to the kilns instead of about four parts of seed as found in Europe.

The following table of typical values for process conditions illustrates the difference in the two standard commercial version of the Bayer process.

| Bauxite | Surinam | French |
|---|---|---|
| Alumina mineral | Gibbsite ($Al_2O_3 \cdot 3H_2O$) | Boehmite ($Al_2O_3 \cdot H_2O$). |
| Process | American Trihydrate | European Monohydrate. |
| Digester conditions: | | |
| Temperature | 290° F | 390° F. |
| Caustic Concentration | 170 grams/liter | 424 grams/liter. |
| Pressure | 60 p. s. i. g | 210 p. s. i. g. |
| Time for digesting | 20–30 minutes | 60–200 minutes. |
| A/C Charging ratio* | .62 | .58. |
| Precipitator Conditions: | | |
| A/C ratio* of pregnant liquor | .62 | .58. |
| Caustic concentration | 170 grams/liter | 200 grams per liter. |
| Time for precipitation | 36–48 hours | 72–120 hours. |

*A/C charging ratios are on a weight basis of $Al_2O_3/NaOH$ wherein the NaOH is expressed as equivalent $Na_2CO_3$.

Readily apparent, although not specifically shown in the table, is the extreme amount of evaporation necessary when a monohydrate type of ore such as boehmite is processed. This is evident from a comparison of caustic concentration in the digester and precipitation phase of each process. Thus, a further advantage of the trihydrate type of recovery is the saving in steam cost. These advantages of the American Bayer process are mostly due to the inherent nature of the raw material used and the ability to attain economically a high charging ratio with a trihydrate type of extraction process.

The high grade gibbsite ore used in North America and sometimes processed in England is a relatively expensive material found in restricted locations in South America, Africa or East Indies in not unlimited amounts. The increasing demand for aluminum metal, and consequently for alumina, necessitates the utilization of lower grade bauxites which are cheaper and more accessible. These cheaper ores may be either boehmite or in most instances a bauxite containing both trihydrate and monohydrate alumina, the latter being present in substantial amounts. West Indian, that is, Jamaican and Haitian laterites are prime examples of such cheaper ores containing mixtures of gibbsite and boehmite in weight ratios of trihydrate to monohydrate from about four or five to one. Consequently, American Bayer plants must be rendered amenable to the processing of such mixed hydrate ores, or at best, mixtures of these ores with a gibbsite ore to extend the available quantities of the latter.

The conventional and well-known single digest methods for extracting alumina are not the most efficient and economical means for the processing of single ore or a mixture of aluminous ores containing mixtures of the two forms of alumina. In order to obtain all of the available alumina, both monohydrate and trihydrate in a mixed ore, procesing conditions must be directed to the removal of the least soluble form, i. e., the monohydrate form of alumina. The reason for this is apparent when one realizes that both forms of alumina in the solid state contribute to the concentration of the alumina in the caustic Bayer liquor (the type of alumina in solution being undifferentiated) and the concentration of alumina and caustic are determinative of the extraction potential with respect to the further extraction of either solid form of hydrate under any one set of conditions. For example, if a Jamaican laterite is processed for substantially complete extraction of both monohydrate and trihydrate forms of alumina, digester conditions must be chosen with respect to the extraction of the monohydrate phase. The digester conditions of temperature and caustic concentration must necessarily be high enough during the time of digesting to maintain a sufficient extraction potential with respect to the undissolved monohydrate alumina. Otherwise, substantially complete extraction of the monohydrate alumina will not take place. This can be accomplished only by choosing conditions of caustic concentration and temperature which would produce an equilibrium alumina to caustic soda ratio greater than the desired charging ratio. Although it is known that the Jamaican laterites can be processed according to a monohydrate type of digest and obtain charging ratios corresponding to European practice at caustic concentrations and/or temperatures less than European monohydrate practice because of the physical nature of the bauxite, higher charging ratios corresponding to American practice may only be uneconomically obtained by conditions unheard of in actual Bayer plant practice. Consequently, when processing a bauxite for the extraction of both forms of alumina in a single digest system, the lower charging ratios associated with European practice are the practical limits. The disadvantages found in the autoprecipitation phase of the Bayer process and which are associated with these lower charging ratios common to Europe will thus become apparent when a single monohydrate digest is performed on mixed boehmite-gibbsite ores.

Furthermore, not only is the American Bayer plant unequipped for handling the pregnant liquor with low charging ratios for long periods of time in the precipitators, but the American Bayer plants with their low pressure digesters and low evaporator capacities are not adapted to the processing of this material by a single monohydrate type of digest. Accordingly a single digestion of such ores for the recovery of both monohydrate and trihydrate alumina would involve substantially complete modification of the existing plants at an enormous capital expenditure. Such an operation would lack the advantages and economies of the conventional trihydrate extraction process and involve the use of disadvantageous monohydrate processing conditions in order to obtain high charging ratios on an ore wherein much of the alumina is readily extractible trihydrate.

On the other hand, a Jamaican type of laterite containing substantial quantities of both forms of alumina may be processed according to the conventional American Bayer plant practice for the extraction of the available trihydrate alumina only. In such an operation, lower caustic concentrations and temperatures prove economically attractive as do the higher charging ratios which may be attained and the beneficial precipitation results which flow therefrom. One disadvantage of this method of extraction lies in the inability to recover the available monohydrate alumina. Consequently, when compared with a method for complete extraction of both available monohydrate and trihydrate alumina, greater amounts of bauxite are required per unit of production. It is obvious that such an extraction is uneconomical where appreciable amounts of the monohydrate form of alumina are present in the ore. Not only does this increase the cost of bauxite per unit of product, but soda ash, lime and starch consumption, being a function of the amount of bauxite processed, are also substantially increased.

Another disadvantage with a mere trihydrate alumina process when applied to an ore containing both monohydrate and trihydrate alumina is the tendency of a caustic Bayer solution which is supersaturated with respect to the monohydrate alumina saturation concentration for the particular conditions employed to precipitate solid monohydrate alumina. Thus, under digestion conditions the liquor is unsaturated with respect to the trihydrate alumina but supersaturated with respect to the boehmite. Thus, trihydrate alumina dissolves, forms sodium aluminates, then precipitates on the monohydrate crystals as monohydrate and is removed with the red mud. This phenomenon is sometimes termed "reversion" or "inversion." Where undissolved monohydrate alumina is present, as is the case in the residue of a mixed bauxite from which only the trihydrate alumina has been extracted, the amount of precipitation is increased because of the catalytic or seeding effect of the undissolved monohydrate alumina. Thus, although limited reversion takes place spontaneously in the conventional tritydrate extraction of Surinam types of bauxites to some extent, the loss from reversion is even greater when a Jamaican type of ore is subjected to trihydrate extraction.

The red mud residue from the trihydrate alumina extraction, containing monohydrate alumina and the sodium aluminum silicate desilication compounds, could be treated by the lime-soda sinter step of the American combination process in an effort to recover the alumina. There are serious objections to the use of that method. The large amounts of iron oxide in the mixed gibbsite-boehmite ore residue imposes a heavy load on the sinter kiln and in addition interfere with the reaction of the lime with sodium aluminum silicate. That iron oxide is not inert to the reaction of lime with such aluminum silicates is well-known in the cement industry. Accordingly, the American Bayer process, even with the added sinter step, is not an economical and efficient method of processing a West Indian laterite containing available alumina in the form of both gibbsite and boehmite.

The present invention is directed to an advantageous solution of the problems as above defined, and is particularly applicable in the solution of such problems involving the utilization of West Indian laterites containing mixtures of gibbsite and boehmite wherein the former predominates, whether this ore be used as the sole source of alumina or whether it be used in conjunction with a high grade gibbsite bauxite, such as the Surinam ores of South America. It must be emphasized, however, that the invention is not limited to this particular application in that it finds advantageous use in the production of alumina from a mixture of ores wherein one ore contains all of the alumina in monohydrate form (boehmite) and the other may be a high grade gibbsite ore or even an ore containing a mixture of the trihydrate and the monohydrate, such as the West Indian laterites.

Accordingly, it is a primary object and purpose to provide an improved wet alkali aluminate process for the production of alumina from an aluminous ore or ores containing both alumina trihydrate and monohydrate whereby substantially all of the advantages of the ordinary American Bayer or trihydrate process are realized, the American Bayer plant facilities and equipment may be utilized with only minor additions, and all or substantially all of the available alumina in the mixture of ores or mixed ore may be recovered, including the monohydrate alumina. It is a further object of the invention to provide a process for the production of alumina involving a two-stage digestion in a given cycle on successive quantities of different ores or successive quantities of the same ore under varying conditions whereby all or substantially all of the available alumina in the ores or ore may be recovered by precipitation from the green or alumina enriched liquor at alumina to caustic ratios normally utilizable only in processing ores containing all of the available alumina in trihydrate form. It is a further object of the invention to provide such a novel wet alkali aluminate method for the production of alumina from two or more ores or a mixed hydrate ore wherein at least one of the ores contains all of its alumina or substantial quantities thereof as monohydrate alumina, and at least one such ore contains all or a predominant part of its alumina as trihydrate, which process is extremely flexible in regard to the proportions of the different ores charged to the respective digestion stages so that the process may be varied in this regard depending upon availability of the several ores which may be utilized in the process. Conversely, it is an object of the invention to provide a process which may utilize almost any combination of raw materials, that is aluminous ores, ranging, for example, from Grecian monohydrate bauxites, to the mixed trihydrate and monohydrate bauxites of Jamaica, to Surinam bauxite over a wide range of proportions of the respective ores.

Other objects and advantages of the process of the invention will become apparent from the following detailed description thereof. In this regard, the invention is described in detail with reference to one of its most advantageous embodiments, namely the production of alumina from ores containing mixtures of trihydrate and monohydrate alumina, the $Al_2O_3 \cdot 3H_2O$ predominating in amount when utilized either alone or in conjunction with a high grade trihydrate ore. It is to be understood, however, that such description does not constitute a limitation on the invention and in its generic scope it remains flexible and fully applicable to the different combinations of ores and proportions thereof as set forth above and as will be more fully indicated hereinafter.

It has been found according to the invention that an ore containing both trihydrate and monohydrate alumina may be processed for substantially complete extraction of both forms of alumina, while at the same time obtaining high alumina to caustic soda ratios in the pregnant liquor from which the alumina is precipitated corresponding to those heretofore economically obtainable only in conventional processing of trihydrate ores. This new and unobvious result is advantageously obtained in a two-stage digestion process under digestion conditions of temperature and caustic concentrations far below those which would be necessary in attempting to obtain such alumina to caustic ratios in the liquor to the precipitators by a single digest on the monohydrate alumina-containing ore.

The invention generally comprises a process involving a dual digestion wherein a monohydrate alumina-containing ore is digested in spent caustic aluminate liquor to produce an intermediate alumina to caustic ratio in the liquor substantially exceeding that of the spent liquor but substantially less than that normally obtainable in extraction of a trihydrate alumina ore, increasing the alumina to caustic ratio of the liquor to that normally obtainable in a trihydrate ore extraction by digesting therein an ore, the alumina content of which is predominantly trihydrate, to extract trihydrate alumina only, and thereafter recovering the extracted alumina from the alumina enriched liquor.

Stated otherwise, the invention provides for the production of alumina from ores containing caustic soluble monohydrate and trihydrate alumina by means of a double extraction method wherein a charge of a monohydrate alumina-containing ore is subject to an initial digestion in caustic aluminate liquor under conditions of caustic soda concentration and temperature providing a monohydrate extraction potential throughout the first stage digestion to substantially completely extract all of the monohydrate alumina and also the trihydrate alumina, if any, of the ore charge. Thereafter, the dissolved alumina content of the liquor is substantially increased by digesting therein a second charge of an ore which contains its soluble alumina content predominantly in the form of trihydrate under conditions of caustic soda concentration and temperature providing a trihydrate extraction potential in the liquor throughout digestion of the second ore charge to thereby substantially completely extract the trihydrate alumina content of the second ore charge. Thus, the final alumina to caustic soda ratio in the liquor is increased to value corresponding to that normally obtainable when extracting an all trihydrate alumina ore by conventional American Bayer plant practice.

As stated above with respect to monohydrate alumina extraction, the charging or intermediate alumina to caustic ratio is limited to a value somewhat less than the equilibrium or saturation ratio at the digestion conditions of caustic soda concentration and temperature so that complete extraction of the caustic soluble alumina from the monohydrate alumina-containing ore charge occurs, and the liquor is substantially saturated with respect to monohydrate alumina. Thereafter, the second stage digestion on the predominantly trihydrate alumina-containing ore is performed under typical trihydrate alumina extraction conditions, which provide a trihydrate extraction potential but no monohydrate extraction potential. As exemplified hereinbelow and in the drawings (Figure 2), the temperature of the monohydrate digestion effluent liquor is reduced, and the liquor thereby becomes supersaturated with respect to monohydrate alumina. Thereafter, the caustic soda concentration and temperature of the second stage digestion is effective to extract the trihydrate alumina content of the second ore charge, but not the monohydrate, if the latter is present. Thus, the increased dissolved alumina content, corresponding to the higher alumina to caustic soda ratios of American Bayer practice, is obtained by substantially complete extraction of the trihydrate alumina of the second ore charge.

As has been mentioned previously, a Jamacian type laterite containing alumina in both the trihydrate and monohydrate forms may be processed under less drastic conditions of caustic concentration and temperature for the substantial recovery of both forms of alumina to alumina to caustic soda ratios of the pregnant liquor equivalent to those found under European monohydrate digesting methods. Thus, alumina to caustic soda ratios of the enriched liquor of .58 may be obtained under digesting conditions of caustic concentration and temperature of about 290 grams per liter and 390° F. respectively. Evidently, the physical nature of the Jamaican laterites is an influencing factor as regards digestion condition, this type of bauxite being identified among other things by its highly pulverulent nature. The readily soluble trihydrate dissolves very rapidly and apparently exposes the monohydrate alumina to the action of the caustic liquor and permits in turn the comparatively rapid extraction of the remaining available alumina to an alumina to caustic soda ratio approaching monohydrate equilibrium solubility for the conditions employed in comparatively short times. Nevertheless, higher charging ratios corresponding to those found in American practice cannot be economically obtained by a single monohydrate type of digest because of the solubility limitations of monohydrate alumina.

Accordingly, as an essential step in the improved process of the invention, it is contemplated that in order to extract as much alumina as possible per liquor unit cycled through the digesters and to send a more highly supersaturated liquor to the aluminate precipitators, the alumina concentration is increased by injecting a supplemental charge of ore into the effluent from a monohydrate digest of the Jamaican laterites, and without separating the red mud residue from the partially pregnant liquor from this monohydrate digest, the mixture is subjected to a second digestion under nearly typical trihydrate conditions of extraction, wherein dissolution of the trihydrate alumina from the second ore charged raises the alumina concentration to an acceptable level corresponding to conventional American Bayer plant practice. By means of this dual digestion of the slurries of aluminous ores or ore in the circulating caustic aluminate liquor, a complete extraction of substantially all of the available alumina, both monohydrate and trihydrate, is obtained in the first or monohydrate digest under economical caustic concentrations and temperatures at the expense of the intermediate or monohydrate charging ratio. This ratio is raised then by the second digest to a level which will permit the advantages of the higher precipitation ratios to be realized by extracting the trihydrate alumina in the ore used for the second digestion phase.

Should it be necessary or for some reason desirable to employ a bauxite for the second charge which is a mixed gibbsite-boehmite type of ore, i. e. containing both monohydrate and trihydrate alumina, its monohydrate alumina is not extracted and accordingly, it is preferable to employ a mixed hydrate ore of minimum monohydrate content to eliminate loss of available alumina in so far as possible. On the other hand, the process is amenable to the extraction of all of the available alumina in both ore charges when the ore charged to the second digestion is a gibbsite ore containing substantially no monohydrate. Thus, the extraction of the available alumina from the total ore charge is either complete or substantially complete.

In the preferred embodiment of the invention, intermediate or monohydrate digester charging ratios less than those commonly found in European practice, for example 0.58, are desirable as being more easily and economically obtained. Consequently, caustic concentrations and/or temperatures less than those before indicated may be employed. In this regard, Fig. 1, represents the charging ratios which have been obtained under the digesting conditions of temperature and caustic concentration indicated during a 30 minute digest of Jamaican type laterites. It will be observed that an increase of 10° F. from 375 to 385° F. at 180 grams per liter caustic soda concentration gives an A/C ratio increase of .023. For the same increase in A/C ratio while holding temperature constant at 375° F., it is necessary to increase the concentration from 180 to 211 grams per liter. For the purpose of digester extraction this indicates that it is more economical to extract the available alumina in a monohydrate extraction by using as high a temperature as possible rather than as high a concentration as possible. Because the heat of vaporization of a liquor is appreciably greater than the sensible heat, this is obvious to those skilled in the art. Practically speaking however, the conventional design of digesters, including the materials used in the construction thereof, limits the high pressures necessary for these extraction temperatures to values corresponding to about 400° F. Consequently, lower monohydrate digester charging ratios are more desirable because of the more practical necessity for using higher caustic concentrations for extraction purposes rather than increasing temperature. This is one of the main reasons why extremely high caustic concentrations are found in Europe. The economics of the process, including the costs for evaporator steam and thus the concentrations employed, and the availability of a suitable ore for the trihydrate extracting are the most influencing factors as regards the "intermediate" or monohydrate digester effluent ratio. Although not a part of the preferred embodiment, it may be pointed out where the disadvantages of extremely high caustic soda concentration and temperatures may be tolerated, the intermediate ratio in the effluent from the first digestion may be taken as high as the typical .58 weight ratio of alumina to caustic soda as in European practice. However, to realize substantially all of the advantages of the invention it is the definitely preferred embodiment thereof to limit the charge of bauxite to the first or monohydrate digester so that much lower caustic soda concentrations may be employed and preferably also somewhat lower temperatures. We thus approach in this manner the steam economy of the American Bayer process in treating an all gibbsite ore.

As indicated above, the intermediate ratio in the monohydrate digester effluent may be taken as high as .58 without exceeding caustic soda concentrations of about 300 g./l. and without exceeding a temperature of about 400° F. On the other hand, when the charge of bauxite to the monohydrate digester is sufficiently limited, as above mentioned, substantially typical American Bayer digestion conditions of caustic soda concentration and temperature not less than about 170 g./l. and 300° F., respectively may be employed.

Regardless of the conditions employed in the first or monohydrate digestion, it is a distinct and novel advantage of the present invention that by the use of either a gibbsite ore in the second ore charge or by sacrificing the small amount of available alumina present as monohydrate in the second charge when a Jamaica ore is used, alumina to caustic soda ratios equal to those obtained with an all trihydrate ore in the pregnant liquor are realized. Such ratios are highly desirable for both a maximum yield on the basis of the caustic liquor circulated and for rapid precipitation of alumina hydrate to give a coarse hydrate and a short holding time in the hydrate precipitators. This gives a greater production of alumina from a given quantity of circulating caustic soda in the liquor stream.

There is substantially complete extraction of all available alumina in the second or sweetening digester and little loss of alumina by what has been termed reversion when a Surinam or gibbsite type of bauxite is used for increasing the intermediate ratio to the final ratio of the pregnant liquor corresponding to American practice. The rate at which reversion takes place under standard American digester conditions of temperature and caustic concentration, when the alumina to caustic soda ratio of the pregnant liquor is increased above the equilibrium monohydrate solubility alumina to caustic soda ratio for the conditions prevailing, is not substantial in that appreciable or uneconomical amounts of solubilized alumina are not lost during a 25 or 30 minute digest. Nevertheless, when a Jamaican type of laterite is used for sweetening purposes, appreciable amounts of alumina are lost during a 30 minute digest because of the seeding effect caused by the solid monohydrate alumina which remains after extraction of the trihydrate alumina in the mixed alumina containing bauxite. These losses where a mixed bauxite is used in the second digest may be substantially overcome or at least minimized because of another seed phenomenon which is a natural result of the way the invention is practiced. Thus, in considering the digester residence time for a single trihydrate extraction process the controlling feature is the amount of time necessary for the desilication reaction to take place, the length of time for dissolution of the available alumina being appreciably less than that for desilication. However, as the invention is practiced, i. e. with the red mud from the first or monohydrate digester being introduced into the second digester phase of the process, the desilication products from the monohydrate digester are added to the second or trihydrate digester wherein they act as seed to catalyze the desilication reaction. Consequently, the time for desilication products to come out of solution after having been formed in the second digester from the ore charged thereto is appreciably less and the time for dissolution of the trihydrate alumina of the second charge to the trihydrate digester will control the necessary residence time for digestion. Reversion takes place only when the alumina to caustic soda ratio of the pregnant liquor is above the equilibrium monohydrate solubility ratio for the particular conditions of the liquor and the greatest amount of reversion takes place when seed monohydrate alumina is present and in contact with the pregnant liquor. It is apparent that if the time can be decreased under which these mentioned conditions of supersaturation exist with respect to the monohydrate equilibrium solubility ratio, losses of solubilized alumina can be made negligible. In this connection trihydrate residence times as low as 15 minutes may be realized with substantially complete extraction of the trihydrate alumina to the desired alumina to caustic soda ratios corresponding to American practice. Thus, with a shorter digester residence time under conditions of supersaturation there is less time in which reversion can take place before the catalyzing seed particles of monohydrate alumina are separated from the pregnant liquor. It should be understood that the reversion reaction is a dynamic one wherein the products of reversion likewise act as seed and affect further precipitation of monohydrate alumina. Consequently, the shorter digester residence time possible will minimize this progressive catalyzing effect.

Furthermore, although trihydrate digestion temperatures slightly higher than in conventional American Bayer practice may be desirable from a heat transfer point of view and will ordinarily be employed when an all trihydrate ore is used for sweetening purposes, when a mixed ore is injected into the second digest for this purpose, temperatures more closely approximating American conditions should be employed because the rate of the reversion reaction is appreciably less at these temperatures. Consequently, reversion may be controlled to a substantial extent by employing trihydrate digesting temperatures of about 290° F. or lower when utilizing a mixed ore for sweetening purposes wherein the reversion factor would be of substantial importance. When utilizing a Surinam or all trihydrate type of ore for the second digest, the shorter residence time during the sweetening phase of the operation is unnecessary and therefore longer digestion times may be desirable for more complete extraction. Nevertheless, when a mixed ore is used for the second digest, the advantages from a shorter trihydrate digest, possible because of the fast desilication reaction, are greater than the longer residence times possible in a trihydrate alumina extraction when viewed from a reversion standpoint of view.

The proportions of the monohydrate digestion ore charge and the trihydrate digestion ore charge and therefore the intermediate alumina to caustic ratios of the monohydrate digester effluent in actual operations will be predicated primarily upon the availability of the different types of ore amendable to the process and the most economic process conditions under which such available ores may be processed for recovery of all or substantially all of the total available alumina. Where large proportions of high grade gibbsite ore are available for charging to the trihydrate or sweetening digester, intermediate or monohydrate charging ratios will decrease proportionally. Likewise, the costs of operating the process will decrease as the intermediate ratio is lowered because of the less drastic conditions necessary to obtain the lower ratios. Where only a mixed alumina containing bauxite is available and must therefore be utilized in the trihydrate digestion phase in order to obtain the higher ratios common to the American trihydrate process, the intermediate ratio will depend primarily on the raw material and processing costs. In general, it is preferable to operate the process of the invention at the lowest practical intermediate charging ratio in the monohydrate digester effluent so that the lowest practical operating conditions of temperature and caustic concentration may be maintained in the monohydrate digester. For lower intermediate monohydrate digester ratios, with increasing proportions of total ore charge going to the sweetening or second digest, the caustic concentration may advantageously be lowered to values corresponding to those employed in a typical high grade gibbsite ore trihydrate extraction process.

The advantages of this two-stage extraction or sweetening process are best shown by considering the amounts of bauxite, evaporation requirements and steam consumption for the production of one pound of alumina when compared with the same requirements for a single monohydrate digest process and single trihydrate digest process utilizing the same bauxite. In this regard the following tabulated data is given for processing a Jamaican bauxite.

|  | Single Monohydrate Digest Process | Single Trihydrate Digest Process | Two State Sweetening Process |
|---|---|---|---|
| Bauxite Requirements | 2.31 | 2.68 | 2.43 |
| Spent liquor alumina to caustic soda ratio | .300 | .324 | .333 |
| Monohydrate Digester Condition: |  |  |  |
| Temperature °F | 400 |  | 390 |
| Caustic concentration (gram/liter) | 260 |  | 190 |
| Alumina to caustic soda effluent ratio | .580 |  | .543 |
| Trihydrate Digester Condition: |  |  |  |
| Temperature °F |  | 300 | 300 |
| Caustic concentration (gram/liter) |  | 194 | 194 |
| Alumina to caustic soda effluent ratio |  | .622 | .622 |
| Digester liquor heater steam | 0 | .604 | 0 |
| Digester Injection Steam | 2.64 | .909 | 1.98 |
| Total Digestion Steam | 2.64 | 1.513 | 1.98 |
| Necessary evaporation in pounds of water | 11.1 | 3.1 | 4.31 |

It will be observed that definite advantages are obtained over either single digest method of extraction. The amounts of evaporation required per pound of alumina produced by a single monohydrate method of extraction are greater than the two-stage digestion system which is the basis of this invention. Moreover, the finishing ratio associated with the single monohydrate process corresponds to European practice and will impose the disadvantageous fine product and long precipitation cycle at the decomposing phase of the process. By utilizing stage-wise flashing of the monohydrate digester effluent, steam with a proper temperature level for heat transfer purposes may be realized and thereby eliminate the necessity for operating steam for the spent liquor preheaters. In this connection, the extra injection steam used in the two-stage sweetening process is minimized when compared with the single trihydrate digest process wherein operating steam for the spent liquor preheaters is necessary. Furthermore, although the two-stage process requires slightly greater amounts of evaporation and digestion steam, the lesser amount of bauxite necessary for a given yield of product will more than offset these factors.

Thus, by utilizing the two-stage monohydrate-trihydrate extraction process which is disclosed herein, the beneficial advantage found in the precipitation phase of the American Bayer process will be realized when using a monohydrate containing bauxite, and the disadvantageous high evaporation and digester steam requirements of the European or ordinary single monohydrate type of digest will be minimized to a substantial degree. It is emphasized that the above tabulated data is based on utilizing the same mixed alumina ore in the second or trihydrate digester of the sweetening process disclosed herein, and that under the preferred embodiment of the invention further economies may be realized by utilizing a high grade gibbsite ore for this second digestion phase.

Although the foregoing detailed and illustrative matter regarding the invention has been set forth particularly with reference to utilization of a mixed gibbsite-boehmite ore of the Jamaican type in the monohydrate or first digestion, an ore of the European type containing all available alumina in monohydrate form may be employed with substantially equal facility under European monohydrate conditions and substantial advantages realized by raising the alumina to caustic ratio to a level corresponding to American practice. Accordingly, by inserting a trihydrate digester after the monohydrate digesting and flashing phase, as exists in conventional European Bayer practice, and by subjecting a high trihydrate alumina containing bauxite such as Surinam or Jamaican ores, to a trihydrate digestion in the liquor containing the previously digested boehmite residues, there may be obtained the high ratio sodium aluminate enriched liquors which on autoprecipitation yield a better quality product in a shorter time than possible with lower ratio liquors.

Figure 2:
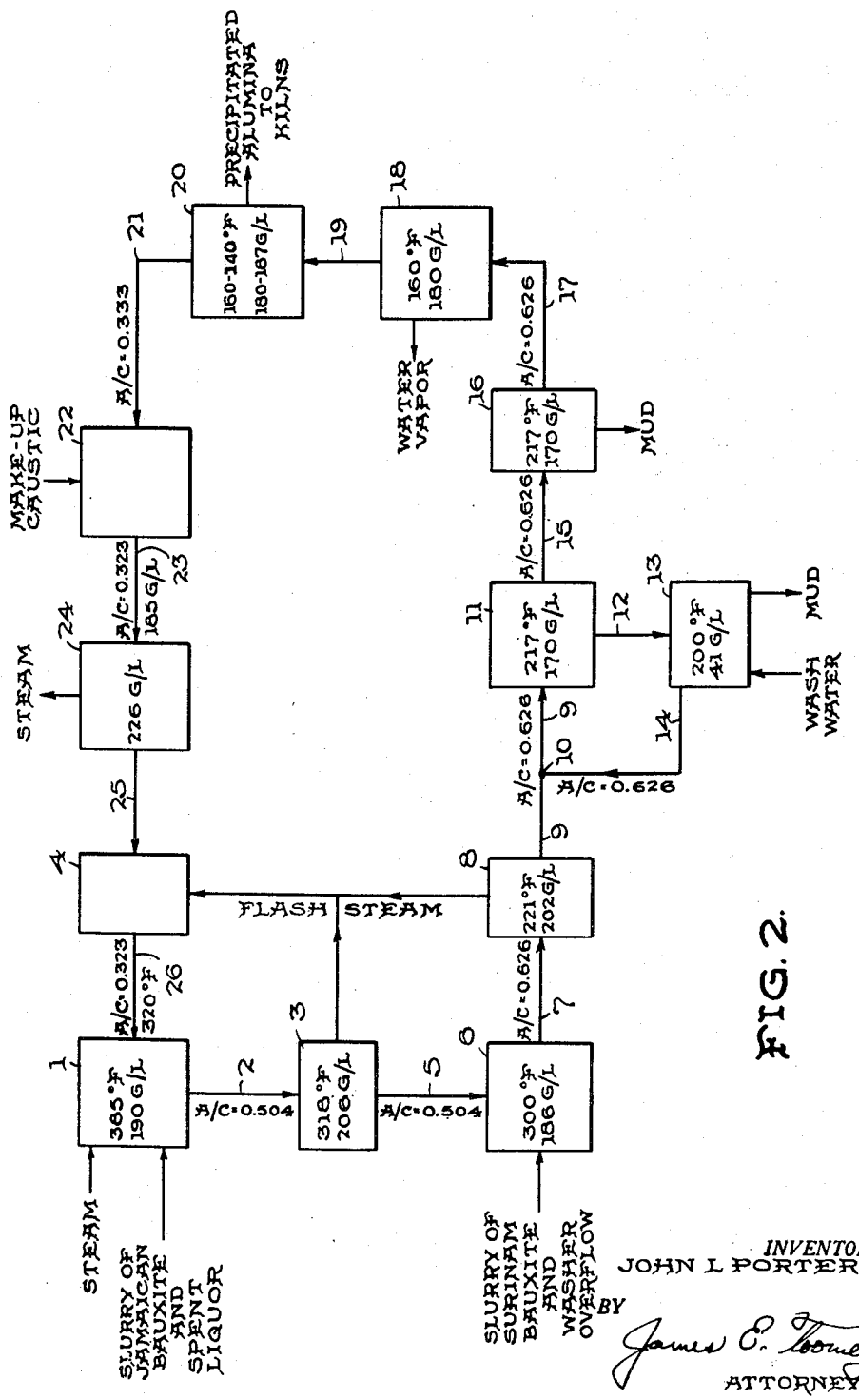

The invention is hereinafter described with reference to the diagrammatic flow sheet in Figure 2 of the drawings, illustrating a typical embodiment thereof as applied to a Jamaican ore charged to the monohydrate digester and a gibbsite or trihydrate alumina ore (Surinam) charged to the second or sweetening digester. The values indicated are based on digesting a Jamaican bauxite having an analysis of 40% available trihydrate alumina, 6% available monohydrate alumina and 2% silica and digesting Surinam type of bauxite having an analysis of 51% available trihydrate alumina and 3% silica.

A Jamaican bauxite slurried with spent liquor is subjected to a monohydrate digest in digester 1 with spent liquor having an alumina to caustic soda ratio of .323 and temperatures of 320° F. Digesting conditions of 385° F. and 190 grams per liter caustic soda are maintained by the addition of steam. After digestion, the partially pregnant liquor having an intermediate alumina to caustic soda ratio of .504 is led through line 2 to flash chambers 3 where the temperature of the liquor is decreased by flashing in stages to 318° F. and the caustic concentration of the liquor correspondingly increased to 206 grams per liter. The flashed steam from the flash chambers 3 is utilized for preheating the spent liquor to the monohydrate digester 1 in heat exchangers 4. From the flash chambers 3 the partially pregnant liquor containing the residue from the monohydrate digester 1 is pumped through line 5 to trihydrate digester 6 where Surinam bauxite, previously slurried with washer overflow, is subjected to a trihydrate extraction of the available alumina at 300° F. and 186 grams per liter caustic. After the trihydrate digestion the pregnant liquor having an alumina to caustic soda ratio of .626 and the undissolved residue from both digestion phases is led through line 7 to flash tanks 8 where the liquor is flashed to 221° F. and the concentration increased to 202 grams per liter caustic soda. The flashed steam from flash tanks 8 is used to preheat the spent liquor to the monohydrate digester 1 in heat exchangers 4 as is the case with the flash steam from the flash chambers 3. The pregnant liquor is transported from flash tanks 8 through line 9 and mixed with mud washer overflow at point 10 to give a caustic concentration of 170 grams per liter and temperature of 217° F. in the mud settlers 11. The underflow from the mud settlers 11 is led through line 12 to mud washers 13 which has an overflow of wash water at 200° F. and 41 grams per liter caustic concentration. This overflow of wash water from washers 13 is conveyed in line 14 to point 10 where it is mixed with the effluent from the flash tanks 8 as previously explained. The partially clarified pregnant liquor from settlers 11 is guided through line 15 to filter presses 16 where the remaining red mud that is held in suspension is separated from the highly enriched sodium aluminate liquor and discarded. After being pumped through line 17 from the filters 16, the liquor is cooled in vacuum cooler 18 to 160° F. by evaporation to 180 grams per liter caustic soda and is thereafter conveyed to the precipitator tanks 20 by line 19. During the decomposing cycle in precipitator tanks 20 the temperature decreases to 140° F. and the alumina to caustic soda ratio changes from .626 to .333 while the concentration of the liquor increases from about 180 to 187 grams per liter caustic soda. The precipitated alumina product is then removed and calcined. The spent liquor from the precipitator tanks is then led through line 21 to tank 22 where make up caustic is added and the liquor thereafter transported to evaporators 24 through lines 23. After concentration to 226 grams per liter caustic soda in evaporators 24, the spent liquor is led through lines 25 to heat exchangers 4 where the temperature of the liquor is raised to 320° F. From heat exchangers 4 the spent liquor is conveyed to the monohydrate digester 1 by line 26 whereafter the cycle repeats itself.

It is to be understood that the invention is by no means limited to any particular proportions of monohydrate and trihydrate alumina in the total alumina extracted in the process. For example, in treating a mixture of boehmite ores and gibbsite ores the monohydrate extract may comprise 80% of the total alumina extracted while the trihydrate alumina represents only 20%. On the other hand, when extracting a mixture of ores such as a high trihydrate-low monohydrate Jamaican ore in conjunction with a trihydrate ore the extracted trihydrate alumina may represent as high as about 90% of the total available alumina whereas the monohydrate alumina extracted would constitute only about 10% or even less. Accordingly, the invention is by no means limited to the illustrative examples provided hereinabove, but only by the scope of the appended claims.

What is claimed is:

1. An improved wet caustic aluminate process for the production of alumina from ores containing caustic soluble monohydrate and trihydrate alumina comprising the steps of subjecting a charge of a monohydrate alumina-containing ore to an initial digestion in caustic aluminate liquor having a caustic soda concentration and temperature which provide a monohydrate extraction potential in the liquor throughout said digestion thereby substantially completely extracting the alumina of the ore charge, and thereafter substantially increasing the dissolved alumina content of the liquor by digesting therein a charge of an ore, the soluble alumina content of which is at least predominantly trihydrate, under conditions of caustic soda concentration and temperature which provide a trihydrate extraction potential in the liquor but not a monohydrate extraction potential throughout digestion of the second mentioned ore charge thereby substantially completely extracting the trihydrate alumina content of said second ore charge.

2. An improved wet caustic aluminate process for the production of alumina from ores containing caustic soluble monohydrate and trihydrate alumina comprising the steps of digesting a charge of a monohydrate alumina-containing ore in caustic aluminate liquor having a caustic soda concentration and temperature which provide a monohydrate extraction potential in the liquor throughout said digestion thereby substantially completely extracting the alumina of the ore charge, substantially reducing the temperature of the liquor resulting from the first ore digestion such that the liquor is supersaturated with respect to monohydrate, alumina, and thereafter substantially increasing the dissolved alumina content of the liquor by digesting therein a charge of an ore, the soluble alumina content of which is at least predominantly trihydrate, under conditions of caustic soda concentration and temperature which provide a trihydrate extraction potential in the liquor but not a monohydrate extraction potential throughout digestion of said second ore charge thereby substantially completely extracting the trihydrate alumina content of said second ore charge.

3. An improved wet caustic aluminate process for the production of alumina from ores containing caustic soluble monohydrate and trihydrate alumina comprising the steps of subjecting a charge of a mixed monohydrate trihydrate alumina-containing ore to an initial digestion in caustic aluminate liquor having a caustic soda concentration and temperature which provide a monohydrate extraction potential in the liquor throughout said digestion thereby substantially completely extracting the alumina of the ore charge, the liquor resulting from said first ore digestion being substantially saturated with respect to monohydrate alumina and thereafter substantially increasing the dissolved alumina content of the liquor by digesting therein a charge of an ore, the soluble alumina content of which is at least predominantly trihydrate, under conditions of caustic soda concentration and temperature which provide a trihydrate extraction potential in the liquor but not a monohydrate extraction potential throughout digestion of said second ore charge thereby substantially completely extracting the trihydrate alumina content of the second mentioned ore charge.

4. An improved wet caustic aluminate process for the production of alumina from ores containing caustic soluble monohydrate and trihydrate alumina comprising the steps of digesting a charge of a monohydrate alumina-containing ore in caustic aluminate liquor having a caustic soda concentration and temperature which provide a monohydrate extraction potential in the liquor throughout said digestion thereby substantially completely extracting the alumina of the ore charge, the liquor resulting from said first ore digestion being substantially saturated with respect to monohydrate alumina, substantially reducing the temperature of the liquor resulting from the first ore digestion such that the liquor is supersaturated with respect to monohydrate alumina, and thereafter substantially increasing the dissolved alumina content of the liquor by digesting therein a charge of an ore, the soluble alumina content of which is at least predominantly trihydrate, under conditions of caustic soda concentration and temperature which provide a trihydrate extraction potential in the liquor but not a monohydrate extraction potential throughout digestion of said second ore charge thereby substantially completely extracting the trihydrate alumina content of said second ore charge.

5. A process according to claim 4 wherein the ore first charged contains all the soluble alumina therein as monohydrate.

6. A process according to claim 4 in which the ores both first and second charged contain the available alumina predominantly in trihydrate form and are low in monohydrate.

7. An improved continuous wet caustic aluminate process for the production of alumina from ores containing caustic soluble monohydrate and trihydrate alumina comprising the steps of first subjecting to an initial digestion in circulating spent caustic aluminate liquor a charge of a monohydrate alumina-containing ore in amounts producing an alumina to caustic soda ratio in the liquor substantially exceeding that of the spent liquor but not exceeding about 0.58, the liquor having a caustic soda concentration and temperature which provide a monohydrate extraction potential in the liquor throughout said digestion thereby producing said alumina to caustic soda ratio by substantially completely extracting the alumina of the ore charge, and thereafter substantially increasing the alumina to caustic soda ratio of the liquor resulting from the first digestion up to about 0.63 by digesting therein a second charge of an ore, the soluble alumina content of which is at least predominantly trihydrate, under conditions of caustic soda concentration and temperature which provide a trihydrate extraction potential in the liquor but not a monohydrate extraction potential throughout digestion of said second ore charge thereby substantially completely extracting the trihydrate alumina content of said second ore charge.

8. An improved continuous wet caustic aluminate process for the production of alumina from ores containing caustic soluble monohydrate and trihydrate alumina comprising the steps of first digesting in circulating spent caustic aluminate liquor a charge of a monohydrate alumina-containing ore in amounts producing an alumina to caustic soda ratio in the liquor substantially exceeding that of the spent liquor but not exceeding about 0.58, the liquor having a caustic soda concentration and temperature which provide a monohydrate extraction potential in the liquor throughout said digestion thereby producing said alumina to caustic soda ratio by substantially completely extracting the alumina of the ore charge, cooling the liquor resulting from the first ore digestion such that the liquor is supersaturated with respect to monohydrate alumina and thereafter substantially increasing the alumina to caustic soda ratio of the liquor resulting from the first digestion up to about 0.63 by digesting therein a second charge of an ore, the soluble alumina content of which is at least predominantly trihydrate, under conditions of caustic soda concentration and temperature which provide a trihydrate extraction potential in the liquor but not a monohydrate extraction potential throughout digestion of said second ore charge thereby substantially completely extracting the trihydrate alumina content of said second ore charge.

9. An improved continuous wet caustic aluminate process for the production of alumina from ore containing caustic soluble monohydrate and trihydrate alumina comprising the steps of digesting a first charge of a monohydrate alumina-containing ore in circulating spent caustic aluminate liquor under digestion conditions of caustic soda concentration not substantially less than about 170 grams per liter nor exceeding about 300 grams per liter and a temperature not substantially less than about 300° F. nor exceeding about 400° F., the ore being charged in amounts producing an alumina to caustic soda ratio in the liquor substantially exceeding that of the spent liquor but not exceeding about 0.58, said digestion conditions being so regulated that the alumina content of the ore charge is substantially completely extracted at the alumina to caustic soda ratio produced and the liquor is substantially saturated with respect to monohydrate alumina, and thereafter increasing the alumina to caustic soda ratio of the liquor from the first ore digestion by digesting therein a second charge of an ore, the soluble alumina of which is at least predominantly trihydrate, the liquor being maintained under conditions of caustic soda concentration and temperature which provide an extraction potential with respect to undissolved trihydrate alumina but none with respect to monohydrate alumina throughout digestion of said second ore charge thereby substantially completely extracting the trihydrate alumina content of said second ore charge, said temperature of the second ore digestion not exceeding about 300° F.

10. An improved continuous wet caustic aluminate process for the production of alumina from ore containing caustic soluble monohydrate and trihydrate alumina comprising the steps of digesting a first charge of a monohydrate alumina-containing ore in circulating spent caustic aluminate liquor under digestion conditions of caustic soda concentration not substantially less than about 170 grams per liter nor exceeding about 300 grams per liter and a temperature not substantially less than about 300° F. nor exceeding about 400° F., the ore being charged in amounts producing an alumina to caustic soda ratio in the liquor substantially exceeding that of the spent liquor but not exceeding about 0.58, said digestion conditions and the amount of ore charged being so regulated that the alumina content of the ore charge is substantially completely extracted at the alumina to caustic soda ratio produced and the liquor is substantially saturated with respect to monohydrate alumina, cooling the liquor resulting from the first ore digestion such that the liquor is supersaturated with respect to monohydrate alumina and thereafter increasing the alumina to caustic soda ratio of the liquor from the first ore digestion by digesting therein a second charge of an ore, the soluble alumina of which is at least predominantly trihydrate, the liquor being maintained under conditions of caustic soda concentration and temperature which provide an extraction potential with respect to undissolved trihydrate alumina but none with respect to monohydrate alumina throughout digestion of said second ore charge thereby substantially completely extracting the trihydrate alumina content of said second ore charge.

11. An improved wet caustic aluminate method for the production of alumina from ores containing caustic soluble monohydrate and trihydrate alumina comprising the steps of first digesting a charge of monohydrate alumina-containing ore in caustic aluminate liquor and extracting substantially all of the caustic soluble alumina, the liquor resulting from the said digestion being unsaturated with respect to trihydrated alumina, and thereafter substantially increasing the dissolved alumina content of the liquor by digesting therein a second charge of a different ore, the soluble alumina content of which is substantially all trihydrate and extracting substantially all of the trihydrate alumina of said second ore charge.

12. An improved wet caustic aluminate method for the production of alumina from ores containing caustic soluble monohydrate and trihydrate alumina comprising the steps of digesting a first charge of a monohydrate alumina containing ore in caustic aluminate liquor maintained under digestion conditions which provide a monohydrate extraction potential in the liquor throughout said digestion thereby extracting substantially all of the alumina of the ore charge, the liquor resulting from said digestion being substantially saturated with respect to monohydrate alumina but unsaturated with respect to trihydrate alumina, and thereafter substantially increasing the dissolved alumina content of the liquor by digesting therein a second charge of a different ore, the soluble alumina content of which is substantially all trihydrate, the liquor being maintained under digestion conditions which provide a trihydrate extraction potential but no monohydrate extraction potential throughout digestion of said second ore charge thereby substantially completely extracting the trihydrate alumina content of said second ore charge.

13. An improved continuous wet caustic aluminate process for the production of alumina from ores containing caustic soluble monohydrate and trihydrate alumina comprising the steps of digesting in circulating spent caustic aluminate liquor a first charge of a monohydrate alumina-containing ore in amounts producing an alumina to caustic soda ratio in the liquor substantially exceeding that of the spent liquor but not exceeding about 0.58, the liquor having a caustic soda concentration and temperature which provide a monohydrate extraction potential in the liquor throughout said digestion thereby producing said alumina to caustic soda ratio by substantially completely extracting the alumina of the ore charge, and thereafter substantially increasing the alumina to caustic soda ratio of the liquor resulting from the first digestion up to about 0.63 by digesting therein a second charge of a different ore, the soluble alumina content of which is substantially all trihydrate, under conditions of caustic soda concentration and temperature which provide a trihydrate extraction potential in the liquor but not a monohydrate extraction potential throughout digestion of said second ore charge thereby substantially completely extracting the trihydrate alumina content of said second ore charge.

14. A process according to claim 13 in which the ore first charged contains all the soluble alumina therein as monohydrate.

15. A process according to claim 13 in which the ore first charged contains a minor portion of the soluble alumina as monohydrate and a major portion as trihydrate.

16. An improved continuous wet caustic aluminate process for the production of alumina from ores containing caustic soluble monohydrate and trihydrate alumina comprising the steps of digesting in circulating spent caustic aluminate liquor a first charge of a monohydrate alumina-containing ore in amounts producing an alumina to caustic soda ratio in the liquor substantially exceeding that of the spent liquor but not exceeding about 0.58, the liquor having a caustic soda concentration and temperature which provide a monohydrate extraction potential in the liquor throughout said digestion thereby producing said alumina to caustic soda ratio by substantially completely extracting the alumina of the ore charge, cooling the liquor resulting from the first ore digestion such that the liquor is supersaturated with respect to monohydrate alumina and thereafter substantially increasing the alumina to caustic soda ratio of the liquor resulting from the first digestion up to about 0.63 by digesting therein a charge of a second different ore, the soluble alumina content of which is substantially all trihydrate, under conditions of caustic soda concentration and temperature which provide a trihydrate extraction potential in the liquor but not a monohydrate extraction potential throughout digestion of said second ore charge thereby substantially completely extracting the trihydrate alumina content of said second ore charge.

17. In a continuous wet caustic aluminate method for the production of alumina from aluminous materials containing both caustic soluble monohydrate and trihydrate alumina wherein the hydrated alumina is extracted from said materials by digestion in circulating caustic aluminate liquor and subsequently recovered therefrom by autoprecipitation, the improved process of increasing the alumina to caustic soda ratio in the liquor resulting from digestion to about 0.63 and substantially completely extracting the caustic soluble alumina content of the materials while avoiding digestion conditions of caustic soda concentration and temperature exceeding about 300 g./l. and 400° F. respectively, which comprises the steps of digesting a first monohydrate alumina-containing ore charge in circulating spent caustic aluminate liquor under digestion conditions maintaining a monohydrate alumina extraction potential throughout the digestion and not exceeding the aforesaid caustic soda concentration and temperature, thereby completely extracting the caustic soluble alumina therein and producing an alumina to caustic soda ratio substantially exceeding that of the spent liquor but not exceeding about 0.58, the liquor being substantially saturated with respect to monohydrate alumina, and thereafter increasing the alumina to caustic soda ratio of the liquor from the first ore digestion to about 0.63 by digesting therein a charge of a second ore, the soluble alumina content of which is at least predominantly trihydrate at temperatures maintaining a trihydrate extraction potential throughout said digestion, and not exceeding about 300° F. thereby substantially completely extracting the trihydrate alumina content of said second ore charge.

18. In a wet caustic aluminate method for the production of alumina from aluminous materials containing both monohydrate and trihydrate alumina wherein the hydrated alumina of the materials is dissolved by digestion in caustic liquor, the improved two-stage digestion process of increasing the dissolved alumina content in the liquor resulting from digestion over that obtainable by a single digestion of substantially the same quantities of the same aluminous materials while avoiding the maintenance of digestion conditions of caustic soda concentration and temperature based on the lower solubility of monohydrate alumina in substantially completing the extraction of the alumina from such quantities of aluminous materials, which comprises subjecting a charge of a mixed monohydrate-trihydrate alumina-containing material to an initial digestion in caustic liquor and completely extracting the alumina content of the charge, said charge being limited in amount to provide a portion only of the total increment in dissolved alumina content, and thereafter digesting in the liquor resulting from the first stage digestion a second charge of an aluminous material, the alumina of which is at least predominantly trihydrate and substantially completely extracting the trihydrate alumina of said second charge to provide the balance of the increased dissolved alumina content of the liquor.

References Cited in the file of this patent

UNITED STATES PATENTS

| | | |
|---|---|---|
| 515,895 | Bayer | Mar. 6, 1894 |
| 2,066,209 | Lurie | Dec. 29, 1936 |
| 2,244,194 | Haglund | June 3, 1941 |
| 2,522,605 | Cundiff | Sept. 19, 1950 |

FOREIGN PATENTS

| | | |
|---|---|---|
| 451,090 | Great Britain | July 29, 1936 |
| 478,489 | Great Britain | Jan. 19, 1938 |
| 637,578 | Great Britain | May 24, 1950 |

OTHER REFERENCES

Tiemann: "Extraction of Alumina from Haiti and Jamaica Bauxites," Journal of Metals, vol. 3, May 1951 (presented at St. Louis Meeting AIMF, February 1951), pages 389–393.

Sherwin: "Extractive Metallurgy of Aluminum," Journal of Metals, vol. 188, No. 4, April 1950, pages 661–667, AIME meeting, N. Y., February 1950.